(12) United States Patent
Guggarigoudar et al.

(10) Patent No.: US 11,544,683 B2
(45) Date of Patent: Jan. 3, 2023

(54) SYSTEM, METHOD, AND COMPUTER PROGRAM PRODUCT FOR A CONTACTLESS ATM EXPERIENCE

(71) Applicant: Visa International Service Association, San Francisco, CA (US)

(72) Inventors: Praveen Kumar Suresh Guggarigoudar, Cedar Park, TX (US); Vahini Mohan, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/080,212

(22) Filed: Oct. 26, 2020

(65) Prior Publication Data

US 2022/0129872 A1    Apr. 28, 2022

(51) Int. Cl.
*G06Q 20/10*    (2012.01)
*G06Q 20/32*    (2012.01)
*G06Q 20/40*    (2012.01)

(52) U.S. Cl.
CPC ..... *G06Q 20/1085* (2013.01); *G06Q 20/3255* (2013.01); *G06Q 20/4012* (2013.01)

(58) Field of Classification Search
USPC ......................................................... 705/43
See application file for complete search history.

(56) References Cited

U.S. PATENT DOCUMENTS

| | | | |
|---|---|---|---|
| 8,632,000 B2 | 1/2014 | Laracey | |
| 9,010,627 B1 | 4/2015 | Prasad et al. | |
| 10,108,959 B2 | 10/2018 | Wolfs et al. | |
| 10,445,711 B1 | 10/2019 | Arumugam | |
| 10,535,047 B1 | 1/2020 | Thomas et al. | |
| 10,614,442 B2 | 4/2020 | Gupta et al. | |
| 2006/0206709 A1* | 9/2006 | Labrou | G06Q 20/32 713/167 |
| 2007/0203850 A1* | 8/2007 | Singh | G07F 19/207 705/67 |
| 2011/0055084 A1* | 3/2011 | Singh | G06Q 20/1085 455/414.1 |
| 2015/0058216 A1 | 2/2015 | Luciani | |
| 2017/0124544 A1* | 5/2017 | Recriwal | G07F 19/20 |
| 2017/0262823 A1 | 9/2017 | Hartung | |
| 2020/0111089 A1 | 4/2020 | Laracey | |

* cited by examiner

*Primary Examiner* — Ambreen A. Alladin
(74) *Attorney, Agent, or Firm* — The Webb Law Firm (57) ABSTRACT

Systems, methods, and computer program products for a contactless automated teller machine (ATM) experience receive, from a telephone number, a first short message service (SMS) message including a unique identifier associated with an ATM terminal; in response to receiving the first SMS message, communicate, to the ATM terminal, a first password associated with the telephone number and the unique identifier; receive, from the telephone number, a second SMS message including the first password; verify the first password; in response to verifying the first password, transmit, to the telephone number, a third SMS message including an option to withdraw cash from the ATM terminal; receive, from the telephone number, a fourth SMS message including a selection of the option to withdraw the cash from the ATM terminal; and communicate, to the ATM terminal, a cash dispense command that causes the ATM terminal to dispense the cash.

9 Claims, 9 Drawing Sheets

SYSTEM, METHOD, AND COMPUTER PROGRAM PRODUCT FOR A CONTACTLESS ATM EXPERIENCE

BACKGROUND

1. Field

This disclosure relates to automated teller machines (ATMs) and, in some non-limiting embodiments or aspects, to a contactless ATM experience using a short message service (SMS) interface.

2. Technical Considerations

The ongoing Covid-19 pandemic has made automated teller machines (ATMs) across the world places of high risk for contacting the virus, particularly due to the multiple touch actions needed to perform banking operations on an ATM terminal. Even with a so-called "contactless" debit card, touch-based keypad entries are required for personal identification number (PIN) entry and other operations, such as balance inquiry, cash withdrawals, and/or the like. Therefore, there is a need for a frictionless and fully contactless ATM solution to ensure cardholder safety and to reduce or prevent potential health hazards.

SUMMARY

Accordingly, provided are improved systems, devices, products, apparatus, and/or methods for providing a contactless automated teller machine (ATM) experience to cardholders by eliminating all touch operations at an ATM terminal, and which does not rely on a smartphone interface with cellular data and/or Internet connectivity. For example, a cardholder may utilize any mobile device with short message service (SMS) messaging capabilities to access a contactless ATM experience, as provided by non-limiting embodiments or aspects.

According to some non-limiting embodiments or aspects, provided is a computer-implemented method including: receiving, from a telephone number, a first short message service (SMS) message including a unique identifier associated with an automated teller machine (ATM) terminal; in response to receiving the first SMS message, communicating, to the ATM terminal, a first password associated with the telephone number and the unique identifier; receiving, from the telephone number, a second SMS message including the first password; verifying that the first password included in the second SMS message corresponds to the first password associated with the telephone number and the unique identifier; in response to verifying the first password, transmitting, to the telephone number, a third SMS message including an option to withdraw cash from the ATM terminal; receiving, from the telephone number, a fourth SMS message including a selection of the option to withdraw the cash from the ATM terminal; and communicating, to the ATM terminal, a cash dispense command, the cash dispense command causing the ATM terminal to dispense the cash for collection at the ATM terminal.

According to some non-limiting embodiments or aspects, provided is a system including: one or more processors programmed and/or configured to: receive, from a telephone number, a first short message service (SMS) message including a unique identifier associated with an automated teller machine (ATM) terminal; in response to receiving the first SMS message, communicate, to the ATM terminal, a first password associated with the telephone number and the unique identifier; receive, from the telephone number, a second SMS message including the first password; verify that the first password included in the second SMS message corresponds to the first password associated with the telephone number and the unique identifier; in response to verifying the first password, transmit, to the telephone number, a third SMS message including an option to withdraw cash from the ATM terminal; receive, from the telephone number, a fourth SMS message including a selection of the option to withdraw the cash from the ATM terminal; and communicate, to the ATM terminal, a cash dispense command, the cash dispense command causing the ATM terminal to dispense the cash for collection at the ATM terminal.

According to some non-limiting embodiments or aspects, provided is a computer program product comprising at least one non-transitory computer-readable medium including program instructions that, when executed by at least one processor, cause the at least one processor to: receive, from a telephone number, a first short message service (SMS) message including a unique identifier associated with an automated teller machine (ATM) terminal; in response to receiving the first SMS message, communicate, to the ATM terminal, a first password associated with the telephone number and the unique identifier; receive, from the telephone number, a second SMS message including the first password; verify that the first password included in the second SMS message corresponds to the first password associated with the telephone number and the unique identifier; in response to verifying the first password, transmit, to the telephone number, a third SMS message including an option to withdraw cash from the ATM terminal; receive, from the telephone number, a fourth SMS message including a selection of the option to withdraw the cash from the ATM terminal; and communicate, to the ATM terminal, a cash dispense command, the cash dispense command causing the ATM terminal to dispense the cash for collection at the ATM terminal.

Further embodiments or aspects are set forth in the following numbered clauses:

Clause 1. A computer-implemented method comprising: receiving, from a telephone number, a first short message service (SMS) message including a unique identifier associated with an automated teller machine (ATM) terminal; in response to receiving the first SMS message, communicating, to the ATM terminal, a first password associated with the telephone number and the unique identifier; receiving, from the telephone number, a second SMS message including the first password; verifying that the first password included in the second SMS message corresponds to the first password associated with the telephone number and the unique identifier; in response to verifying the first password, transmitting, to the telephone number, a third SMS message including an option to withdraw cash from the ATM terminal; receiving, from the telephone number, a fourth SMS message including a selection of the option to withdraw the cash from the ATM terminal; and communicating, to the ATM terminal, a cash dispense command, wherein the cash dispense command causes the ATM terminal to dispense the cash for collection at the ATM terminal.

Clause 2. The computer-implemented method of clause 1, wherein the first password includes a one-time password.

Clause 3. The computer-implemented method of clauses 1 or 2, further comprising: in response to verifying the first password, transmitting, to the telephone number, a fifth SMS message including a prompt to provide a second password associated with the telephone number and an account associated with the telephone number; receiving, from the telephone number, a sixth SMS message including the second password; verifying that the second password included in the sixth SMS message corresponds to the second password associated with the telephone number and the account associated with the telephone number, wherein the third SMS message is transmitted to the telephone number in response to verifying the first password and the second password.

Clause 4. The computer-implemented method of any of clauses 1-3, wherein the second password includes a personal identification number (PIN) for the account associated with the telephone number.

Clause 5. The computer-implemented method of any of clauses 1-4, further comprising: in response to receiving the fourth SMS message including the selection of the option to withdraw the cash from the ATM terminal, transmitting, to the telephone number, a fifth SMS message including a prompt to provide an amount for the withdraw of the cash; and receiving, from the telephone number, a sixth SMS message including the amount for the withdraw of the cash.

Clause 6. The computer-implemented method of any of clauses 1-5, wherein communicating, to the ATM terminal, the first password associated with the telephone number and the unique identifier causes the ATM terminal to display the first password on a display of the ATM terminal.

Clause 7. The computer-implemented method of any of clauses 1-6, wherein the third SMS message further includes an option to view a balance of the account.

Clause 8. A system comprising: one or more processors programmed and/or configured to: receive, from a telephone number, a first short message service (SMS) message including a unique identifier associated with an automated teller machine (ATM) terminal; in response to receiving the first SMS message, communicate, to the ATM terminal, a first password associated with the telephone number and the unique identifier; receive, from the telephone number, a second SMS message including the first password; verify that the first password included in the second SMS message corresponds to the first password associated with the telephone number and the unique identifier; in response to verifying the first password, transmit, to the telephone number, a third SMS message including an option to withdraw cash from the ATM terminal; receive, from the telephone number, a fourth SMS message including a selection of the option to withdraw the cash from the ATM terminal; and communicate, to the ATM terminal, a cash dispense command, wherein the cash dispense command causes the ATM terminal to dispense the cash for collection at the ATM terminal.

Clause 9. The system of clause 8, wherein the first password includes a one-time password.

Clause 10. The system of clauses 8 or 9, wherein the one or more processors are further programmed and/or configured to: in response to verifying the first password, transmit, to the telephone number, a fifth SMS message including a prompt to provide a second password associated with the telephone number and an account associated with the telephone number; receive, from the telephone number, a sixth SMS message including the second password; verify that the second password included in the sixth SMS message corresponds to the second password associated with the telephone number and the account associated with the telephone number, wherein the third SMS message is transmitted to the telephone number in response to verifying the first password and the second password.

Clause 11. The system of any of clauses 8-10, wherein the second password includes a personal identification number (PIN) for the account associated with the telephone number.

Clause 12. The system of any of clauses 8-11, wherein the one or more processors are further programmed and/or configured to: in response to receiving the fourth SMS message including the selection of the option to withdraw the cash from the ATM terminal, transmit, to the telephone number, a fifth SMS message including a prompt to provide an amount for the withdraw of the cash; and receive, from the telephone number, a sixth SMS message including the amount for the withdraw of the cash.

Clause 13. The system of any of clauses 8-12, wherein communication, to the ATM terminal, the first password associated with the telephone number and the unique identifier causes the ATM terminal to display the first password on a display of the ATM terminal.

Clause 14. The system of any of clauses 8-13, wherein the third SMS message further includes an option to view a balance of the account.

Clause 15. A computer program product comprising at least one non-transitory computer-readable medium including program instructions that, when executed by at least one processor, cause the at least one processor to: receive, from a telephone number, a first short message service (SMS) message including a unique identifier associated with an automated teller machine (ATM) terminal; in response to receiving the first SMS message, communicate, to the ATM terminal, a first password associated with the telephone number and the unique identifier; receive, from the telephone number, a second SMS message including the first password; verify that the first password included in the second SMS message corresponds to the first password associated with the telephone number and the unique identifier; in response to verifying the first password, transmit, to the telephone number, a third SMS message including an option to withdraw cash from the ATM terminal; receive, from the telephone number, a fourth SMS message including a selection of the option to withdraw the cash from the ATM terminal; and communicate, to the ATM terminal, a cash dispense command, wherein the cash dispense command causes the ATM terminal to dispense the cash for collection at the ATM terminal.

Clause 16. The computer program product of clause 15, wherein the first password includes a one-time password.

Clause 17. The computer program product of clauses 15 or 16, wherein the instructions further cause the at least one processor to: in response to verifying the first password, transmit, to the telephone number, a fifth SMS message including a prompt to provide a second password associated with the telephone number and an account associated with the telephone number; receive, from the telephone number, a sixth SMS message including the second password; verify that the second password included in the sixth SMS message corresponds to the second password associated with the telephone number and the account associated with the telephone number, wherein the third SMS message is transmitted to the telephone number in response to verifying the first password and the second password, and wherein the second password includes a personal identification number (PIN) for the account associated with the telephone number.

Clause 18. The computer program product of any of clauses 15-17, wherein the instructions further cause the at least one processor to: in response to receiving the fourth SMS message including the selection of the option to withdraw the cash from the ATM terminal, transmit, to the telephone number, a fifth SMS message including a prompt to provide an amount for the withdraw of the cash; and receive, from the telephone number, a sixth SMS message including the amount for the withdraw of the cash.

Clause 19. The computer program product of any of clauses 15-18, wherein communication, to the ATM terminal, the first password associated with the telephone number and the unique identifier causes the ATM terminal to display the first password on a display of the ATM terminal.

Clause 20. The computer program product of any of clauses 15-19, wherein the third SMS message further includes an option to view a balance of the account.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the term "payment device" may refer to a portable financial device, an electronic payment device, a payment card (e.g., a credit or debit card), a gift card, a smartcard, smart media, a payroll card, a healthcare card, a wristband, a machine-readable medium containing account information, a keychain device or fob, an radio frequency identification device (RFID) transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or nonvolatile memory to store information (e.g., an account identifier, a name of the account holder, and/or the like).

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" may refer to a generated display, such as one or more graphical user interfaces (GUIs) with which a user may interact, either directly or indirectly (e.g., through a keyboard, mouse, touchscreen, etc.).

Non-limiting embodiments or aspects of the present disclosure provide for systems, methods, and computer program products that receive, from a telephone number, a first short message service (SMS) message including a unique identifier associated with an automated teller machine (ATM) terminal; in response to receiving the first SMS message, communicate, to the ATM terminal, a first password associated with the telephone number and the unique identifier; receive, from the telephone number, a second SMS message including the first password; verify that the first password included in the second SMS message corresponds to the first password associated with the telephone number and the unique identifier; in response to verifying the first password, transmit, to the telephone number, a third SMS message including an option to withdraw cash from the ATM terminal; receive, from the telephone number, a fourth SMS message including a selection of the option to withdraw the cash from the ATM terminal; and communicate, to the ATM terminal, a cash dispense command, wherein the cash dispense command causes the ATM terminal to dispense the cash for collection at the ATM terminal.

In this way, non-limiting embodiments or aspects of the present disclosure provide for a fully contactless ATM experience in which: (i) a cardholder need not physically touch or interact with the ATM terminal to receive cash, which may be sanitary because it has been stored in the ATM machine and/or disinfected; (ii) an application (e.g., a separate bank specific application for each bank or issuer, etc.) (and/or application server therefor) and a smartphone interface with cellular data and/or Internet connectivity is not needed to access the ATM (e.g., a cardholder may utilize any mobile device with SMS messaging capabilities to withdraw cash from any bank and/or issuer, etc.), thereby providing contactless ATM access to more cardholders, faster processing of contactless ATM transactions, and direct authorization thereof without the use of a mobile application wallet server; and (iii) an ATM is accessed and/or used to dispense cash without the ATM itself receiving or having knowledge of an account number and/or a PIN for the account, thereby improving the security of the contactless ATM access.

Figure 1:
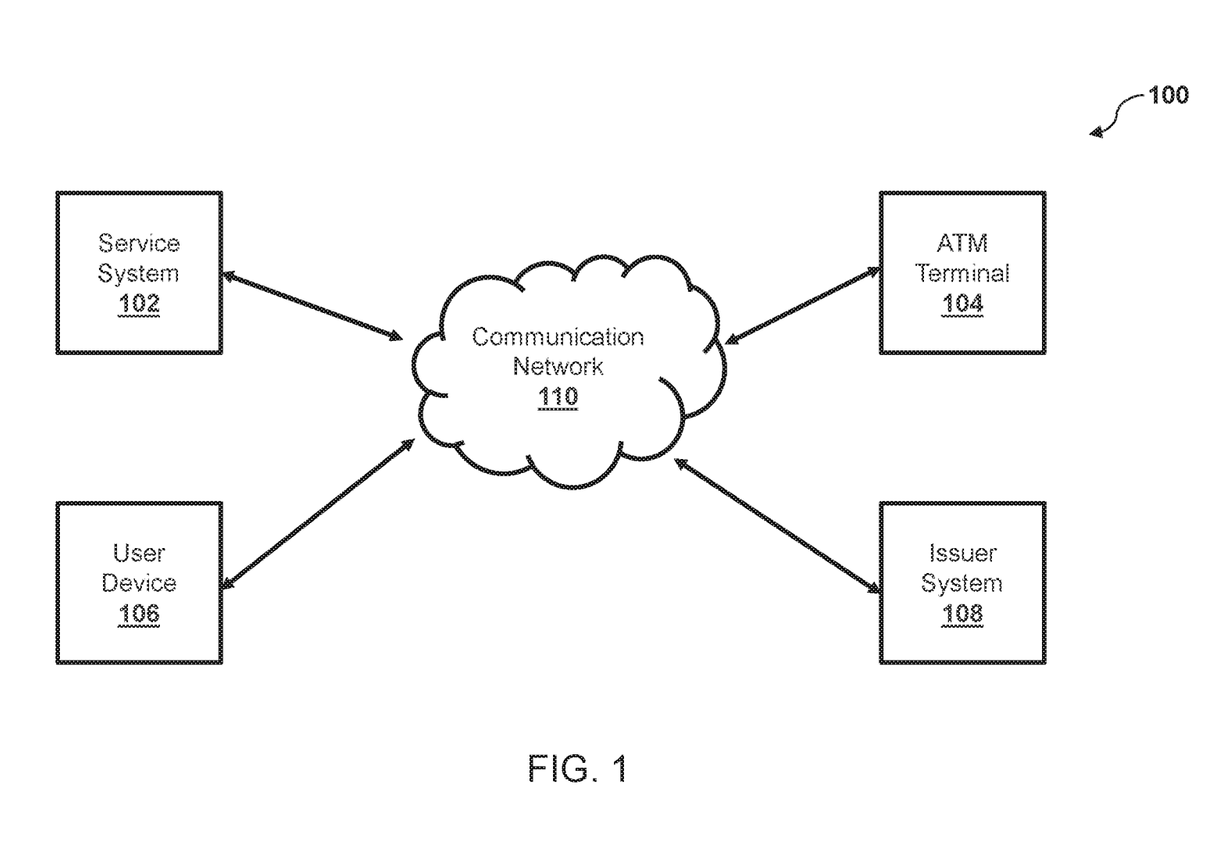
FIG. 1 is a diagram of non-limiting embodiments or aspects of an environment in which systems, devices, products, apparatus, and/or methods, described herein, may be implemented.

Referring now to FIG. 1, FIG. 1 is a diagram of an example environment 100 in which devices, systems, methods, and/or products described herein, may be implemented. As shown in FIG. 1, environment 100 may include service system 102, ATM terminal 104, user device 106, issuer system 108, and/or communication network 110. Service system 102, ATM terminal 104, user device 106, and/or issuer system 108 may interconnect (e.g., establish a connection to communicate, etc.) via wired connections, wireless connections, or a combination of wired and wireless connections.

Service system 102 may include one or more devices capable of receiving information and/or data from ATM terminal 104, user device 106, and/or issuer system 108 via communication network 110 and/or communicating information and/or data to ATM terminal 104, user device 106, and/or issuer system 108 via communication network 110. For example, service system 102 may include a computing device, such as a server, a group of servers, a client device, a group of client devices, and/or other like devices. In some non-limiting embodiments or aspects, service system 102 may be associated with a transaction service provider as described herein. In some non-limiting embodiments or aspects, service system 102 may include one or more communication devices capable of SMS-based communications with user device 106. For example, service system 102 may be associated with a published SMS service number or telephone number via which service system 102 can receive and/or transmit SMS messages.

ATM terminal 104 may include one or more devices capable of receiving information and/or data from service system 102, user device 106, and/or issuer system 108 via communication network 110 and/or communicating information and/or data to service system 102, user device 106, and/or issuer system 108 via communication network 110. For example, ATM terminal 104 may include a computing device, such as a server, a group of servers, a client device, a group of client devices, and/or other like devices. ATM terminal 104 may include components to dispense cash under certain conditions as described herein in more detail.

User device 106 may include one or more devices capable of receiving information and/or data from service system 102, ATM terminal 104, and/or issuer system 108 via communication network 110 and/or communicating information and/or data to service system 102, ATM terminal 104, and/or issuer system 108 via communication network 110. For example, user device 106 may include a client device and/or the like. In some non-limiting embodiments or aspects, user device 106 may include one or more communication devices capable of SMS-based communications with service system 102. For example, user device 106 may be associated with a telephone number via which user device 102 can receive and/or transmit SMS messages.

Communication network 110 may include one or more wired and/or wireless networks. For example, communication network 110 may include a cellular network (e.g., a long-term evolution (LTE) network, a third generation (3G) network, a fourth generation (4G) network, a fifth generation (5G) network a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices and/or systems of environment 100.

Figure 2:
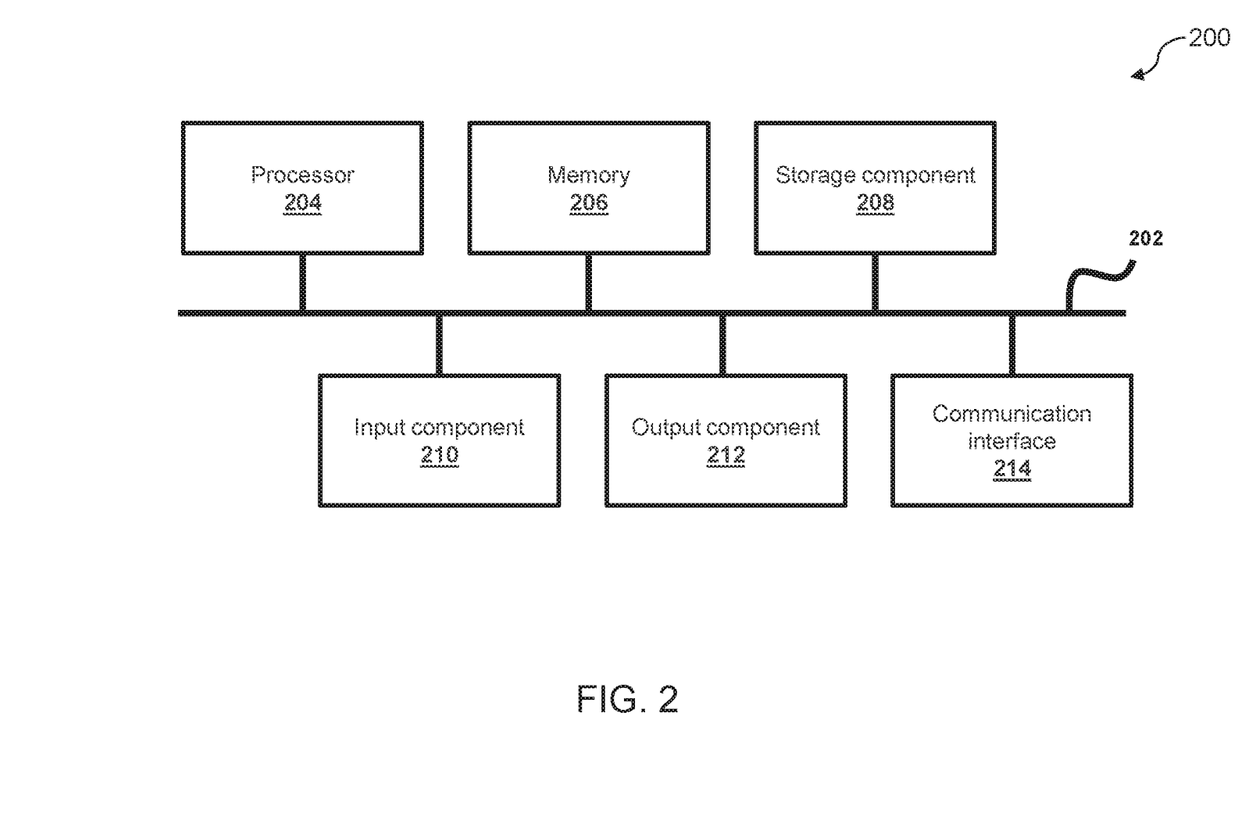
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to one or more devices of service system 102, ATM terminal 104 (e.g., one or more devices of a system of ATM terminal 104, etc.), user device 106 (e.g., one or more devices of a system of user device 106, etc.), and/or one or more devices of issuer system 108. In some non-limiting embodiments or aspects, one or more devices of service system 102, ATM terminal 104 (e.g., one or more devices of a system of ATM terminal 104, etc.), user device 106 (e.g., one or more devices of a system of user device 106, etc.), and/or one or more devices of issuer system 108 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3A:
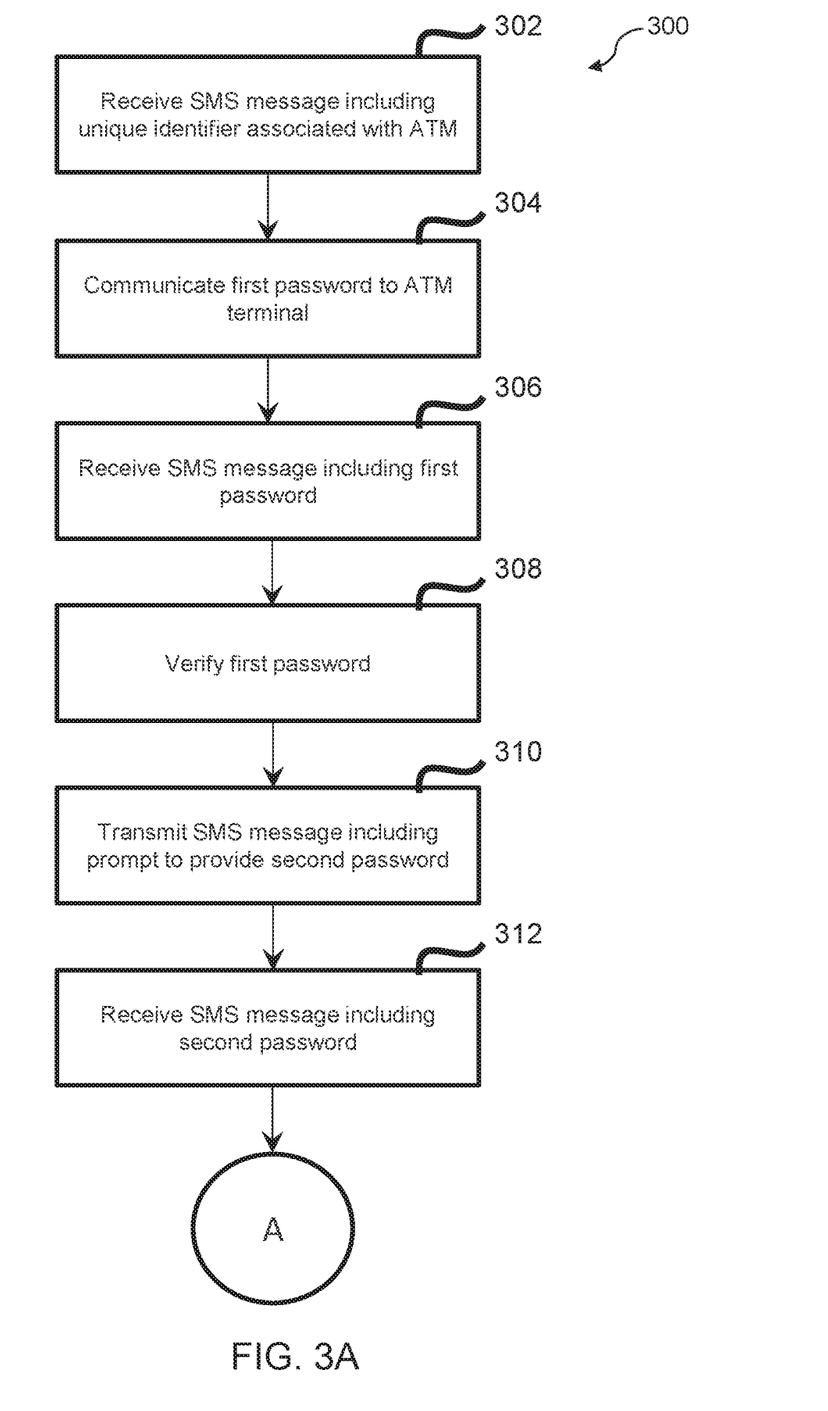
FIGS. 3A and 3B are a flowchart of non-limiting embodiments or aspects of a process for a contactless automated teller machine (ATM) experience.
Figure 3B:
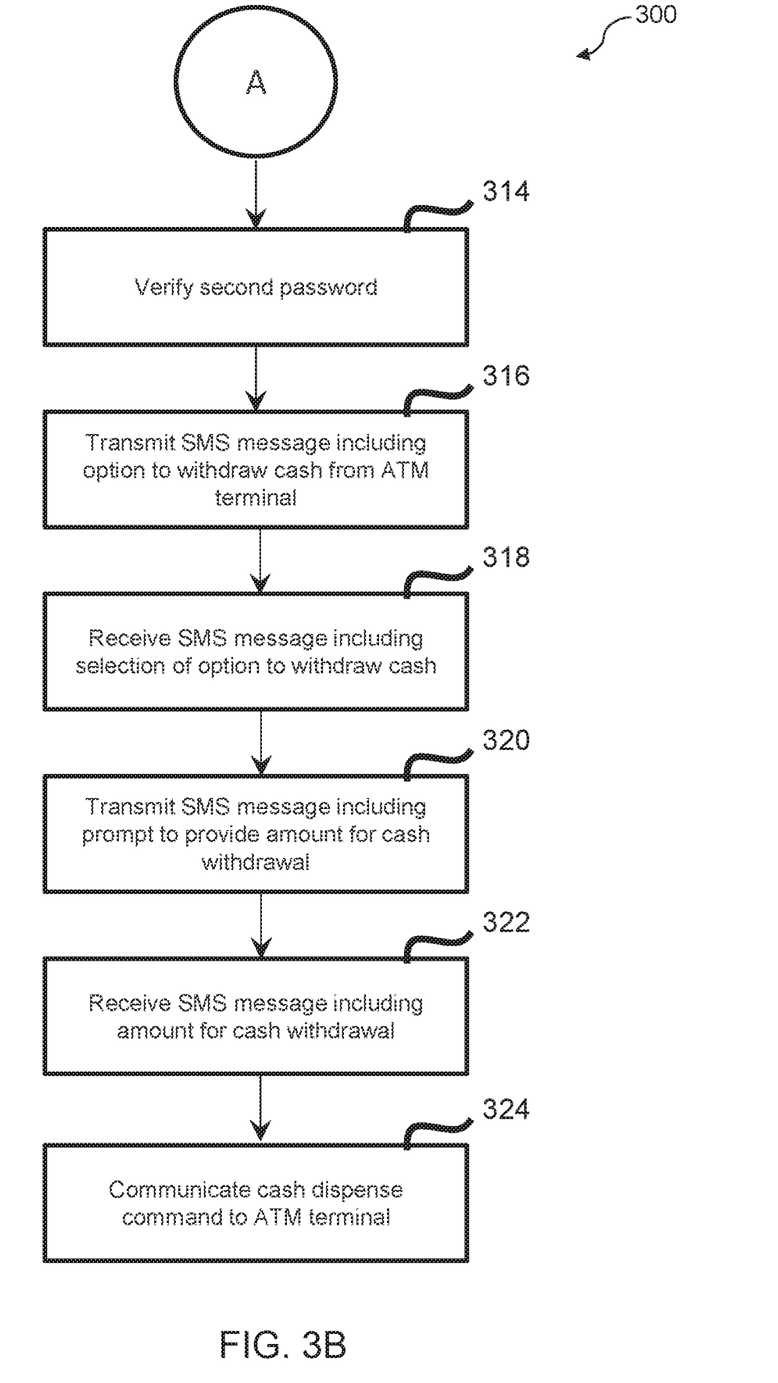

Referring now to FIGS. 3A and 3B, FIGS. 3A and 3B are a flowchart of non-limiting embodiments or aspects of a process 300 for a contactless ATM experience. In some non-limiting embodiments or aspects, one or more of the steps of process 300 may be performed (e.g., completely, partially, etc.) by service system 102 (e.g., one or more devices of service system 102, etc.). In some non-limiting embodiments or aspects, one or more of the steps of process 300 may be performed (e.g., completely, partially, etc.) by another device or a group of devices separate from or including service system 102, such as, ATM terminal 104 (e.g., one or more devices of a system of ATM terminal 104, etc.), user device 106 (e.g., one or more devices of a system of user device 106, etc.), and/or issuer system 108 (e.g., one or more devices of issuer system 108, etc.).

As shown in FIG. 3A, at step 302, process 300 includes receiving an SMS message including a unique identifier associated with an ATM terminal. For example, service system 102 may receive, from a telephone number, a first SMS message including a unique identifier associated with ATM terminal 104. As an example, a user or cardholder may identify an ATM terminal via a registered ATM Terminal Identification Number (TID), which may be physically displayed in print on ATM terminal 104. In such an example, the cardholder may use user device 106 to send an SMS message including the TID to another telephone number associated with service system 102 (e.g., to published SMS service number for service system 102 that allows cardholders to exchange SMS text messages with an automated service, etc.).

In some non-limiting embodiments or aspects, service system 102 may verify that the telephone number from which the first SMS message is received is associated with an account that can be used at ATM terminal 104. In such an example, if the telephone number from which the first SMS message is received is associated with more than one account that can be used at ATM terminal 104, service system 102 may transmit an SMS message to the telephone number including a prompt to select one of the accounts for use at ATM terminal 104.

As shown in FIG. 3A, at step 304, process 300 may include communicating a first password to the ATM terminal. For example, service system 102 may, in response to receiving the first SMS message, communicate, to the ATM terminal, a first password associated with the telephone number and the unique identifier. As an example, the first password may include a one-time password (OTP). In such an example, communicating, to the ATM terminal, the first password associated with the telephone number and the unique identifier may cause the ATM terminal to display the first password on a display of the ATM terminal. For example, the OTP may be displayed on the ATM terminal such that it can be read by a person standing adjacent to the ATM terminal without that person physically interacting with the ATM terminal (e.g., via actuating buttons or a touchscreen, etc.).

In some non-limiting embodiments or aspects, service system 102 may verify that the unique identifier received in the first SMS message is associated with an ATM terminal and, in response to verifying that the unique identifier is associated with the ATM terminal, automatically generate and communicate the OTP to the ATM terminal.

In some non-limiting embodiments or aspects, service system 102 may transmit an SMS message to the telephone number (e.g., to a telephone number associated with an account of the cardholder, to the telephone number from which the first SMS message is received, etc.) including a prompt to enter the OTP displayed on the ATM terminal.

As shown in FIG. 3A, at step 306, process 300 may include receiving an SMS message including the first password. For example, service system 102 may receive, from the telephone number, a second SMS message including the first password. As an example, the cardholder may use user device 106 to send an SMS message including the first password to the another telephone number associated with service system 102.

As shown in FIG. 3A, at step 308, processor 300 may include verifying the first password. For example, service system 102 may verify that the first password included in the second SMS message corresponds to the first password associated with the telephone number and the unique identifier. As an example, service system 102 may compare the first password included in the second SMS message corresponding to the first password associated with the telephone number and the unique identifier and, if they match, verify the first password.

As shown in FIG. 3A, at step 310, process 300 may include transmitting an SMS message including a prompt to provide a second password. For example, service system 102 may, in response to verifying the first password, transmit, to the telephone number, an SMS message including a prompt to provide a second password associated with the telephone number and an account associated with the telephone number. As an example, the second password may include a personal identification number (PIN) for the account associated with the telephone number.

As shown in FIG. 3A, at step 312, process 300 may include receiving an SMS message including the second password. For example, service system 102 may receive, from the telephone number, an SMS message including the second password. As an example, the cardholder may use user device 106 to send an SMS message including the PIN to the another telephone number associated with service system 102.

As shown in FIG. 3B, at step 314, process 300 may include verifying the second password. For example, service system 102 may verify that the second password included in the SMS message corresponds to the second password associated with the telephone number and the account associated with the telephone number. As an example, service system 102 may compare the second password included in the SMS message corresponding to the second password associated with the telephone number and the account associated with the telephone number and, if they match, verify the second password. In such an example, the PIN may be verified as part of a two-step authentication process including the OTP and the PIN.

Although described as being sent via separate SMS messages, in some non-limiting embodiments or aspects, the PIN may be included in the same SMS message used to transmit the OTP to service system 102.

As shown in FIG. 3B, at step 316, process 300 may include transmitting an SMS message including an option to withdraw cash from the ATM terminal. For example, service system 102 may transmit, to the telephone number, in response to verifying the first password and/or the second password, a third SMS message including an option to withdraw cash from the ATM terminal. In some non-limiting embodiments or aspects, the third SMS message may further include an option to view a balance of the account and/or an option to terminate the communication session with service system 102.

As shown in FIG. 3B, at step 318, process 300 may include receiving an SMS message including a selection of the option to withdraw cash. For example, service system 102 may receive, from the telephone number, a fourth SMS message including a selection of the option to withdraw the cash from the ATM terminal. In this way, the cardholder may utilize any user device 106 that has SMS messaging capabilities to access ATM terminal 104 without ATM terminal 104 needing to be modified to communicate with a mobile application and/or a mobile application server. For example, hardware and/or software for service system 102 (e.g., a transaction service provider system, etc.) to communicate with and/or control ATM terminal 104 is already in place, and new communications and/or a mobile application server need not be setup to provide ATM access.

As shown in FIG. 3B, at step 320, process 300 may include transmitting an SMS message including a prompt to provide an amount for the cash withdrawal. For example, service system 102 may, in response to receiving the fourth SMS message including the selection of the option to withdraw the cash from the ATM terminal, transmit, to the telephone number, an SMS message including a prompt to provide an amount for the withdraw of the cash.

As shown in FIG. 3B, at step 322, process 300 may include receiving an SMS message including the amount for the cash withdrawal. For example, service system 102 may receive, from the telephone number, an SMS message including the amount for the withdraw of the cash.

Although described as being sent via separate SMS messages, in some non-limiting embodiments or aspects, the amount for the cash withdrawal may be included in the same SMS message used to transmit the selection of the option to withdraw the cash to service system 102.

As shown in FIG. 3B, at step 324, process 300 may include communicating a cash dispense command to the ATM terminal. For example, service system 102 may communicate, to the ATM terminal, a cash dispense command. As an example, the cash dispense command may cause the ATM terminal to dispense the cash for collection at the ATM terminal. In this way, service system 102 may send the cash dispense command to the ATM terminal to dispense the cash for collection at the ATM terminal without the ATM terminal itself receiving or having knowledge of the account number (e.g., PAN, etc.) and/or the PIN number for the account, thereby improving the security of ATM access.

Referring now to FIGS. 4A-4E, FIGS. 4A-4E are diagrams of an overview of a non-limiting embodiment or aspect of an implementation 400 relating to a process for a contactless ATM experience. As shown in FIGS. 4A-4E, implementation 400 includes service system 402, ATM terminal 404, and user device 406. In some non-limiting embodiments or aspects, service system 402 can be the same as or similar to service system 102. In some non-limiting embodiments or aspects, ATM terminal 404 can be the same as or similar to ATM terminal 104. In some non-limiting embodiments or aspects, user device 406 can be the same as or similar to user device 106.

Figure 4A:
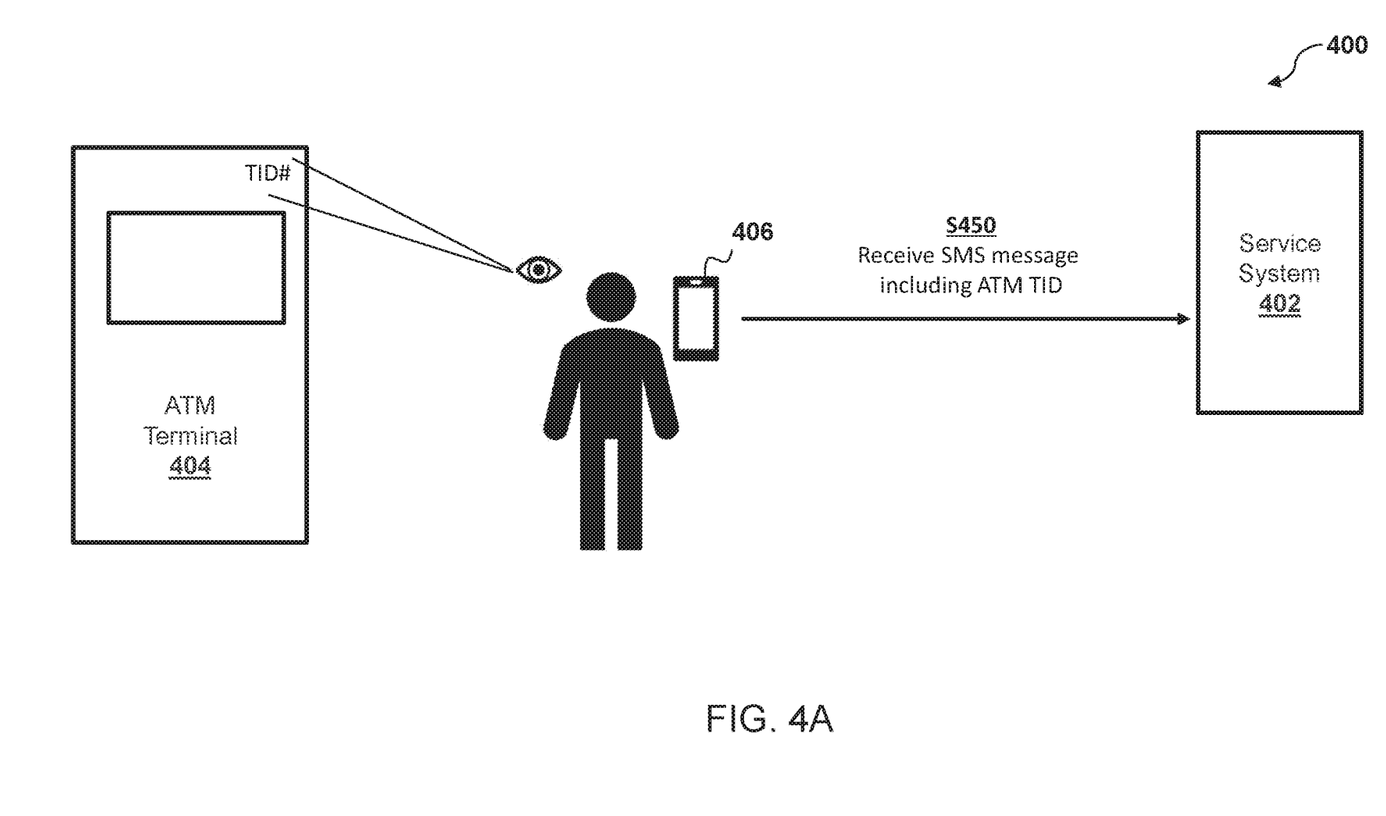
FIGS. 4A-4E are diagrams of an implementation of non-limiting embodiments or aspects of a process for a contactless ATM experience.

As shown by reference number S450 in FIG. 4A, service system 402 receives, from a telephone number, a first SMS message, sent via user device 406, including a TID associated with an ATM terminal.

Figure 4B:
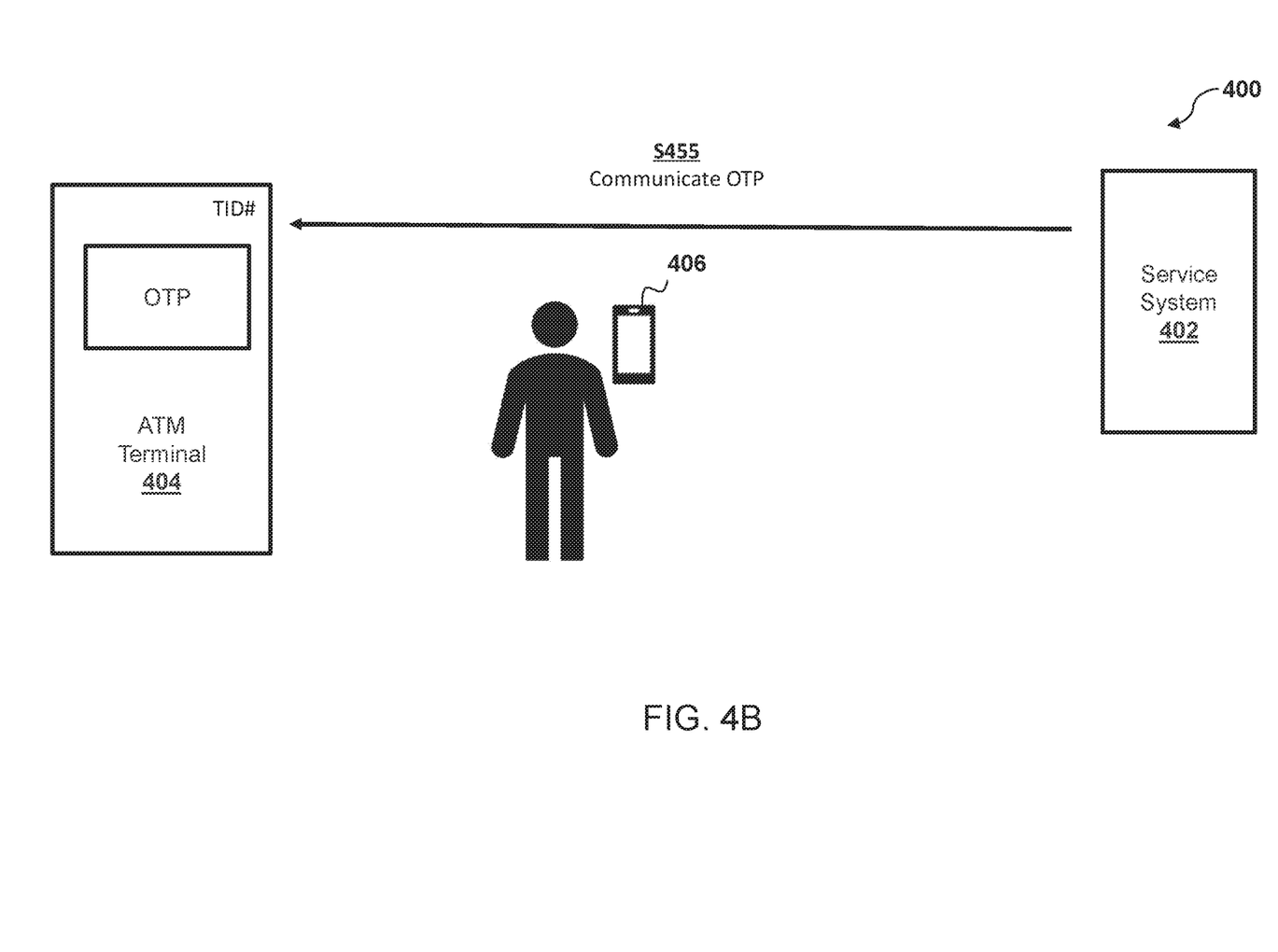

As shown by reference number S455 in FIG. 4B, service system 402, in response to receiving the first SMS message including the TID, communicates to ATM terminal 404 associated with the TID, a OTP associated with the telephone number and the unique identifier, which causes ATM terminal 404 to display the OTP on a display of ATM terminal 404.

Figure 4C:
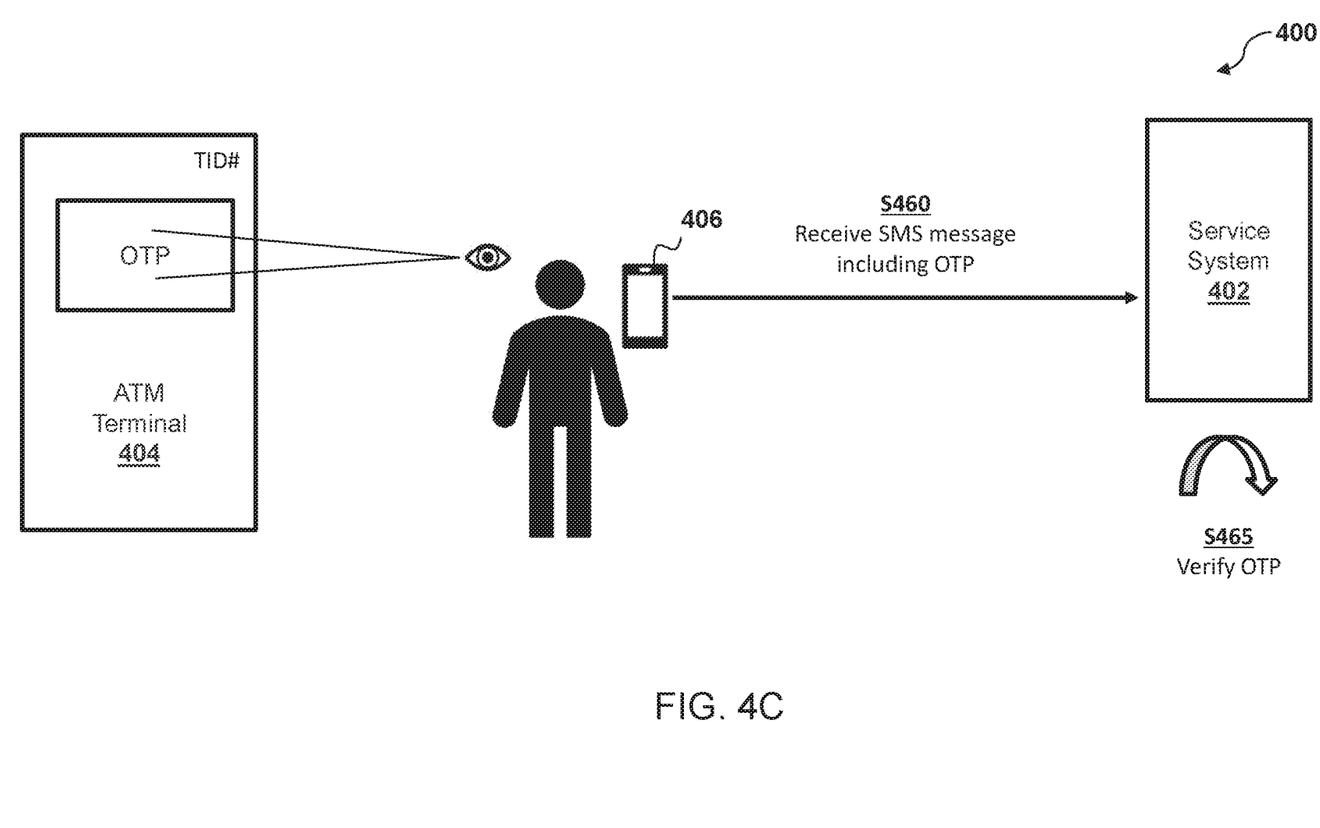

As shown by reference number S460 in FIG. 4C, service system 402 receives, from the telephone number, a second SMS message, sent via user device 406, including the OTP.

As shown by reference number S465 in FIG. 4C, service system 402 verifies that the OTP included in the second SMS message corresponds to the first password OTP associated with the telephone number and the unique identifier.

Figure 4D:
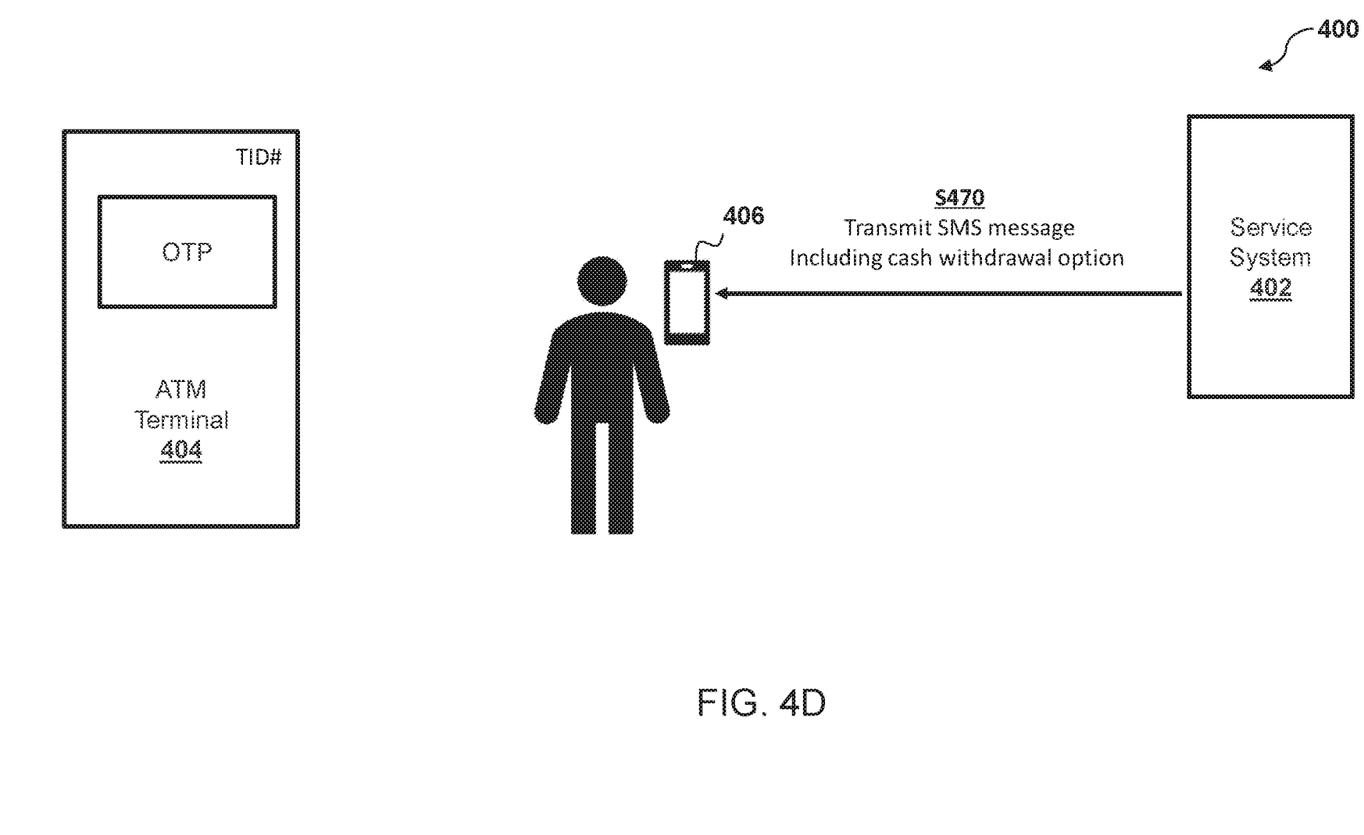

As shown by reference number S470 in FIG. 4D, service system 402, in response to verifying the OTP, transmits, to the telephone number, a third SMS message including an option to withdraw cash from ATM terminal 404 associated with the TI D.

Figure 4E:
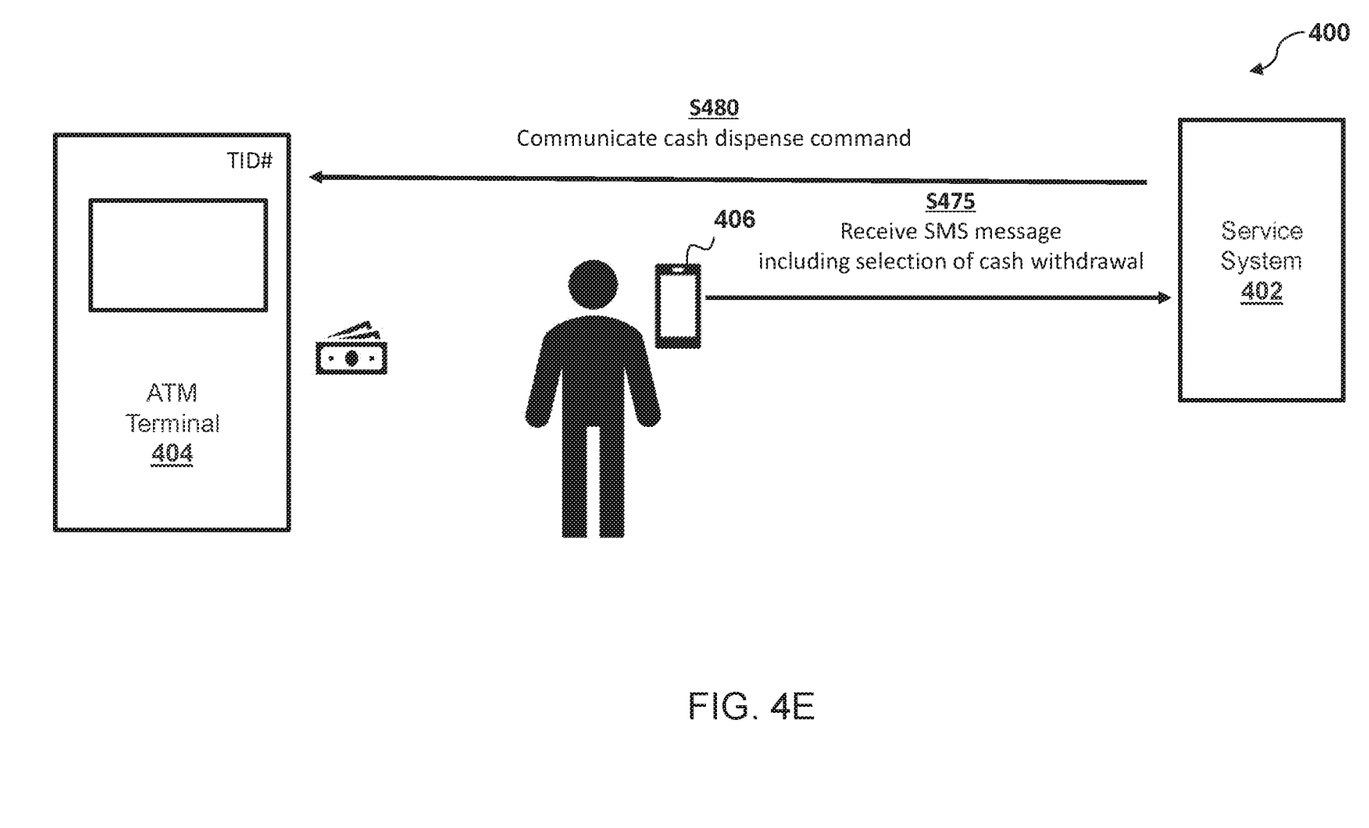

As shown by reference number S475 in FIG. 4E, service system 402 receives, from the telephone number, a fourth SMS message, sent via user device 406, including a selection of the option to withdraw the cash from ATM terminal 404.

As shown by reference number S480 in FIG. 4E, service system 402 communicates, to ATM terminal 404, a cash dispense command which causes ATM terminal 404 to dispense the cash for collection at ATM terminal 404.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method comprising:
   receiving, with at least one processor of a service system, from a user device associated with a telephone number, a first short message service (SMS) message including a unique identifier associated with an automated teller machine (ATM) terminal;
   verifying, with the at least one processor, that the telephone number associated with the user device from which the first SMS message is received is associated with an account;
   in response to receiving the first SMS message, generating, with the at least one processor of the service system, a one-time password as a first password associated with the telephone number and the unique identifier, and communicating, with the at least one processor of the service system, to the ATM terminal, the first password associated with the telephone number and the unique identifier, wherein communicating, to the ATM terminal, the first password associated with the telephone number and the unique identifier causes the ATM terminal to display the first password on a display of the ATM terminal such that the first password is readable by a user when standing adjacent to the ATM terminal without the user physically interacting with the ATM terminal;
   receiving, with the at least one processor of the service system, from the user device associated with the telephone number, a second SMS message including the first password displayed on the display of the ATM terminal;
   verifying, with the at least one processor of the service system, that the first password included in the second SMS message corresponds to the first password associated with the telephone number and the unique identifier;
   in response to verifying the first password:
   transmitting, with the at least one processor of the service system, to the user device associated with the telephone number, a third SMS message including a prompt to provide a second password associated with the telephone number and the account associated with the telephone number,
   receiving, with the at least one processor of the service system, from the user device associated with the telephone number, a fourth SMS message including the second password, and
   verifying, with the at least one processor of the service system, that the second password included in the fourth SMS message corresponds to the second password associated with the telephone number and the account associated with the telephone number;
   based on verifying the first password and the second password, transmitting, with the at least one processor of the service system, to the user device associated with the telephone number, a fifth SMS message including an option to withdraw cash from the ATM terminal;
   receiving, with the at least one processor of the service system, from the user device associated with the telephone number, a sixth SMS message including a selection of the option to withdraw the cash from the ATM terminal; and
   communicating, with the at least one processor of the service system, to the ATM terminal, a cash dispense command, wherein the cash dispense command causes the ATM terminal to dispense the cash for collection at the ATM terminal, wherein the second password includes a personal identification number (PIN) for the account associated with the telephone number, and wherein the cash dispense command causes the ATM terminal to dispense the cash for collection at the ATM terminal without the ATM terminal receiving or having knowledge of an account number of the account associated with the telephone number and the PIN for the account associated with the telephone number.

2. The computer-implemented method of claim 1, further comprising:
   in response to receiving the sixth SMS message including the selection of the option to withdraw the cash from the ATM terminal, transmitting, with the at least one processor of the service system, to the user device associated with the telephone number, a seventh SMS message including a prompt to provide an amount for the withdraw of the cash; and
   receiving, with the at least one processor of the service system, from the user device associated with the telephone number, an eighth SMS message including the amount for the withdraw of the cash.

3. The computer-implemented method of claim 1, wherein the fifth SMS message further includes an option to view a balance of the account.

4. A system comprising:
   one or more processors programmed and/or configured to:
   receive, from a user device associated with a telephone number, a first short message service (SMS) message including a unique identifier associated with an automated teller machine (ATM) terminal;
   verify that the telephone number associated with the user device from which the first SMS message is received is associated with an account;

in response to receiving the first SMS message, generate a one-time password as a first password associated with the telephone number and the unique identifier, and communicate, to the ATM terminal, the first password associated with the telephone number and the unique identifier, wherein communicating, to the ATM terminal, the first password associated with the telephone number and the unique identifier causes the ATM terminal to display the first password on a display of the ATM terminal such that the first password is readable by a user when standing adjacent to the ATM terminal without the user physically interacting with the ATM terminal;

receive, from the user device associated with the telephone number, a second SMS message including the first password displayed on the display of the ATM terminal;

verify that the first password included in the second SMS message corresponds to the first password associated with the telephone number and the unique identifier;

in response to verifying the first password:
  transmit to the user device associated with the telephone number, a third SMS message including a prompt to provide a second password associated with the telephone number and the account associated with the telephone number,
  receive from the user device associated with the telephone number, a fourth SMS message including the second password, and
  verify that the second password included in the fourth SMS message corresponds to the second password associated with the telephone number and the account associated with the telephone number;

based on verifying the first password and the second password, transmit, to the user device associated with the telephone number, a fifth SMS message including an option to withdraw cash from the ATM terminal;

receive, from the user device associated with the telephone number, a sixth SMS message including a selection of the option to withdraw the cash from the ATM terminal; and communicate, to the ATM terminal, a cash dispense command, wherein the cash dispense command causes the ATM terminal to dispense the cash for collection at the ATM terminal, wherein the second password includes a personal identification number (PIN) for the account associated with the telephone number, and wherein the cash dispense command causes the ATM terminal to dispense the cash for collection at the ATM terminal without the ATM terminal receiving or having knowledge of an account number of the account associated with the telephone number and the PIN for the account associated with the telephone number.

5. The system of claim 4, wherein the one or more processors are further programmed and/or configured to:
  in response to receiving the sixth SMS message including the selection of the option to withdraw the cash from the ATM terminal, transmit, to the user device associated with the telephone number, a seventh SMS message including a prompt to provide an amount for the withdraw of the cash; and receive, from the user device associated with the telephone number, an eighth SMS message including the amount for the withdraw of the cash.

6. The system of claim 4, wherein the fifth SMS message further includes an option to view a balance of the account.

7. A computer program product comprising at least one non-transitory computer-readable medium including program instructions that, when executed by at least one processor, cause the at least one processor to:
  receive, from a user device associated with a telephone number, a first short message service (SMS) message including a unique identifier associated with an automated teller machine (ATM) terminal;
  verify that the telephone number associated with the user device from which the first SMS message is received is associated with an account;
  in response to receiving the first SMS message, generate a one-time password as a first password associated with the telephone number and the unique identifier, and communicate, to the ATM terminal, the first password associated with the telephone number and the unique identifier, wherein communicating, to the ATM terminal, the first password associated with the telephone number and the unique identifier causes the ATM terminal to display the first password on a display of the ATM terminal such that the first password is readable by a user when standing adjacent to the ATM terminal without the user physically interacting with the ATM terminal;
  receive, from the user device associated with the telephone number, a second SMS message including the first password displayed on the display of the ATM terminal;
  verify that the first password included in the second SMS message corresponds to the first password associated with the telephone number and the unique identifier;
  in response to verifying the first password:
    transmit to the user device associated with the telephone number, a third SMS message including a prompt to provide a second password associated with the telephone number and the account associated with the telephone number,
    receive from the user device associated with the telephone number, a fourth SMS message including the second password, and
    verify that the second password included in the fourth SMS message corresponds to the second password associated with the telephone number and the account associated with the telephone number;
  based on verifying the first password and the second password, transmit, to the user device associated with the telephone number, a fifth SMS message including an option to withdraw cash from the ATM terminal;
  receive, from the user device associated with the telephone number, a sixth SMS message including a selection of the option to withdraw the cash from the ATM terminal; and
  communicate, to the ATM terminal, a cash dispense command, wherein the cash dispense command causes the ATM terminal to dispense the cash for collection at the ATM terminal, wherein the second password includes a personal identification number (PIN) for the account associated with the telephone number, and wherein the cash dispense command causes the ATM terminal to dispense the cash for collection at the ATM terminal without the ATM terminal receiving or having knowledge of an account number of the account associated with the telephone number and the PIN for the account associated with the telephone number.

8. The computer program product of claim 7, wherein the instructions, when executed by the at least one processor, further cause the at least one processor to:
   in response to receiving the sixth SMS message including the selection of the option to withdraw the cash from the ATM terminal, transmit, to the user device associated with the telephone number, a seventh SMS message including a prompt to provide an amount for the withdraw of the cash; and
   receive, from the user device associated with the telephone number, an eighth SMS message including the amount for the withdraw of the cash.

9. The computer program product of claim 7, wherein the fifth SMS message further includes an option to view a balance of the account.

\* \* \* \* \*